United States Patent Office 3,306,223
Patented Feb. 28, 1967

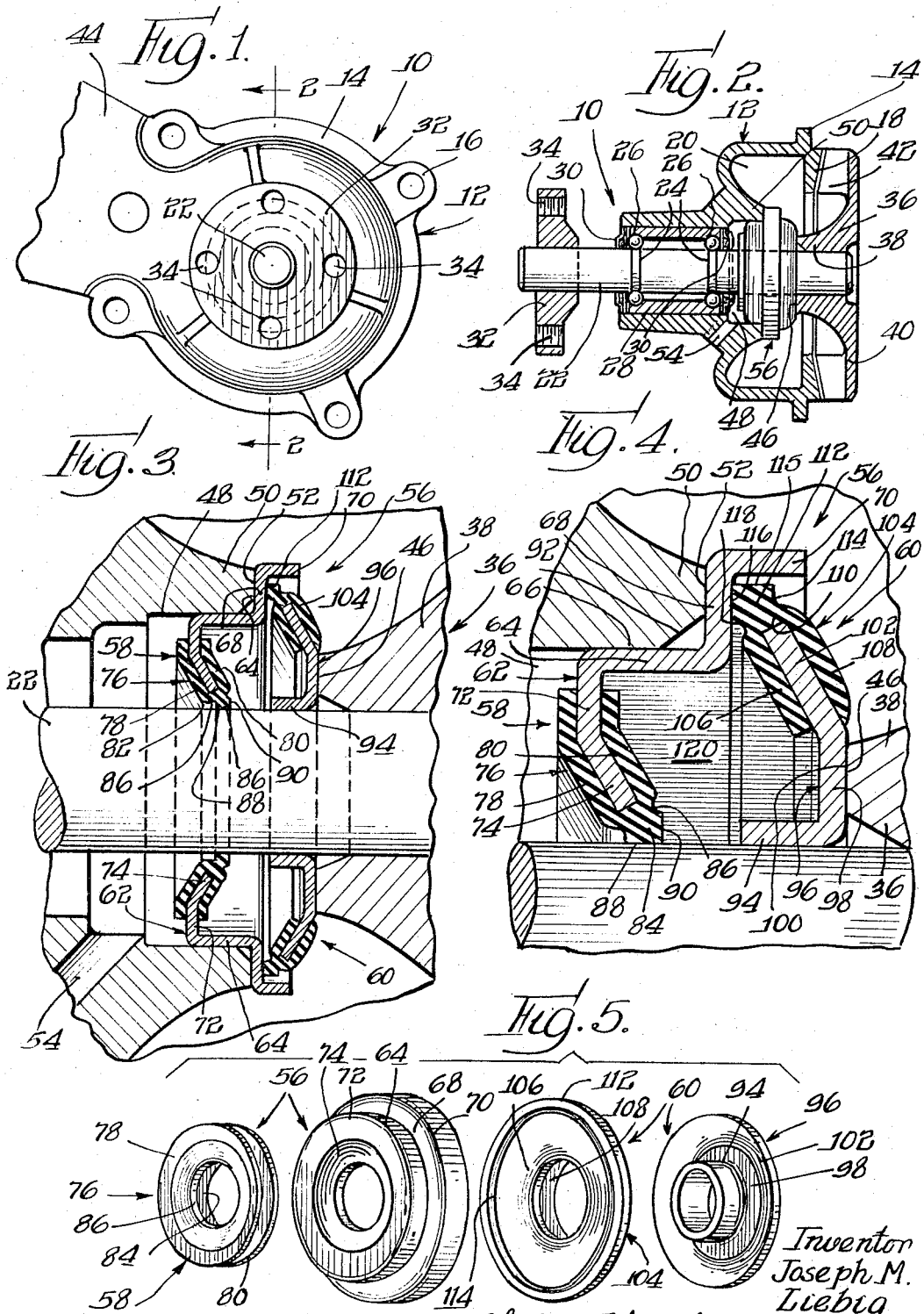

3,306,223
WATER PUMP SEAL
Joseph M. Liebig, Wheaton, Ill., assignor to Illinois Milling, Inc., Chicago, Ill., a corporation of Delaware
Filed Oct. 22, 1964, Ser. No. 405,719
10 Claims. (Cl. 103—111)

This invention relates to the art of automotive water pumps, and particularly is concerned with the provision of an improved water pump seal.

The general construction of water pumps for automotive engines is well known. To prevent the water being pumped from leaking back along the pump shaft, it has been common practice to provide a seal. Such seals commonly have been made of carbon or plastic, and have been in the form of a ring lapped against a surface of the impeller perpendicular to the axis thereof. The ring has been spring urged against this surface.

Although such seals theoretically are capable of excellent operation, they are expensive to produce due to the necessity of lapping each seal in place. Furthermore, automotive engines are made by a sand casting process, and inevitably at least a few grains of sand end up in the interior of the engine in the water passages. These grains of sand eventually pass through the water pump, and frequently deface the bearing surface of the seal to the point it no longer seals properly. Then water passes back along the shaft and out of the engine, whereupon the radiator must be refilled, frequently at rather short intervals.

It is an object of this invention to provide an improved water pump seal which will not be damaged by sand or other grit circulating in the water.

It is another object of this invention to provide a water pump seal which does not have to be lapped with a mating surface.

It is a specific object of this invention to provide a two piece water pump seal, one piece of which keeps sand and other grit away from the second piece which serves as a watertight seal.

Other and further objects and advantages of the present invention will be apparent with regard to the following description and accompanying drawings wherein:

FIG. 1 is an end view of a water pump incorporating the present invention;

FIG. 2 is an axial sectional view therethrough as taken substantially along the line 2—2 in FIG. 1;

FIG. 3 is an enlarged axial sectional view showing additional parts in section;

FIG. 4 is a further enlargement comprising a fragmentary axial sectional view; and FIG. 5 is an exploded perspective view of the parts of the seal.

Reference now should be had in greater particularity to the drawings, and first to FIGS. 1 and 2, wherein there is shown a water pump 10 for an automotive engine including a shell or housing 12. The shell or housing is provided with a peripheral flange 14 having apertured ears 16 thereon for mounting together with other engine parts. An inwardly directed flange 18 adjacent the outer flange 14 acts with the remainder of the shell to define an inner cavity 20. A shaft 22 extends axially through the shell or housing and the shaft is made of hardened steel and is provided with a pair of annular recessed rings 24 in which ball bearings 26 ride. The ball bearings are received also in grooves or races in an outer sleeve 28, and the entire shaft assembly including the shaft, balls, and outer sleeve are inserted as a unit in the housing. Grease seals 30 are provided on opposite sides or ends of the balls and sleeve to retain lubricant about the balls, in accordance with conventional practice.

At the left end, a rotary coupling member 32 is fixed on the shaft by any suitable means, and is provided with circumferentially spaced, tapped apertures 34 for receipt of bolts passing through a rotary drive member associated with the engine, for example a pulley driven by the fan belt.

At the other end, an impeller 36 is pressed on the shaft 22. The impeller conventionally is made of cast iron, although other materials may be used. The impeller comprises a central hub 38 and an end circular wall or flange 40 with a plurality of annularly spaced blades 42 radiating out from the hub 38 along the inner face of the flange or wall 40 for radially pumping water through suitable connection means 44.

The inner end of the hub 38 is provided with a flat face 46, and heretofore the bearing seal has been spring pressed against this face. The seal has been held against rotation, while the impeller rotates. In order to provide a sliding fit between this surface and the prior art bearing seal it has been necessary to lap the two surfaces together, an expensive process. It is obvious that any grain of sand or other grit entering between the surface 46 and the lapped bearing surface of the seal will quickly ruin the seal. It further is to be appreciated that if the motor is not run for an extended period of time the surface 46 is prone to rust. Rust formed thereon will also grind down and ruin the confronting surface of a conventional seal.

The prior art seal generally has been housed in a central chamber 48 within an axially extending circumferential flange 50 forming a part of the shell 12. The flange or projection 50 is provided with a front face 52 which is perpendicular to the axis of the shell and also of the shaft 22. A drain hole 54 extends diagonally down and out from the chamber 48 to drain off any water that might pass the seal.

In accordance with the present invention, and as best may be seen with reference to FIGS. 3–5, the inventive seal disclosed herein is identified generally by the numeral 56, and includes a front or shaft sealing piece 58 and a rear or guard piece 60. The guard piece 58 comprises a sheet steel stamping 62 having a cylindrical mid-section 64. The cylindrical mid portion 64 is received within the cylindrical inner surface 66 of the forward protrusion or flange 50 and forms a tight or press fit therewith. The stamping at its rear end then extends radially out in a circumferential flange 68 slightly beyond the radial limits of the surface 52, against which it forms a tight fit, and then extends again rearwardly as a cylindrical section 70.

At the opposite end of the cylindrical section 64, the sheet metal stamping 62 extends radially in as a flange, ring or wall 72, and has integrally formed therewith a conical inner flange 74. A rubber ring 76 is bonded thereto, and comprises spaced walls 78 and 80 on opposite sides of the ring 72 and conical section 74, joined together at a bight 82. A shaft engaging lip 84 is joined to the bight 82 at a reduced area or neck section 86, the lip being provided with a cylindrical inner surface 88 and a flat face 90 at right angles thereto.

As will be understood, the cylindrical surface 88 forms a snug fit with the shaft 22 to prevent the passage of water along the shaft. The neck 86 imparts a certain degree of freedom to the lip to insure conformity with the shaft. The entire rubber member 76 preferably is molded on the sheet metal stamping, and it will be understood that this member is made of a suitable synthetic rubber or elastomer such as neoprene which is resistant to deterioration from water and lubricants.

Thus, water cannot pass back along the shaft. Neither can it pass between the protrusion 50 and the seal structure 58, due to the tight fit between the cylindrical section 64 and the inner cylindrical surface 66, and also between the flange or wall 68 and the flat surface 52. It will be observed that there is a chamfer or conical surface at 92 between the surfaces 52 and 66 to avoid interference with the adjacent portion of the stamping which is inherently rounded somewhat due to the nature of sheet metal stamping processes.

The rear or guard piece 60 also comprises a sheet metal stamping, having a cylindrical inner portion 94 received fairly tightly on the shaft 22 and rotatable therewith. The guard piece sheet metal stamping, hereinafter identified generically as 96, further includes an integral ring or wall section 98 extending out from the cylindrical section 94 perpendicular to the axis of the shaft 22, and having a rear surface 100 bearing against the surface 46, and rotating therewith. The wall 98 has integrally formed therewith a terminating conical or frusto-conical flange 102 extending toward the wall or ring section 68 and cylindrical flange 70 of the front or shaft seal piece 58.

A rubber sealing element 104 is molded on the sheet metal stamping 96 and includes a pair of walls 106 and 108 lying on opposite sides of the frusto-conical flange 102. These walls may extend down onto the flat wall or ring section 98, although this is generally not necessary. The walls 106 and 108 joined at a bight 110; and a sealing lip 112 is joined thereto at a restriction or neck 114. The lip 112 includes a cylindrical outer surface 115 positioned near the cylindrical flange 70, and a flat face at right angles thereto indicated at 116 perpendicular to the axis of the shaft 22 and bearing against the rear face 118 of the ring or wall 68. The lip surface 116 bears lightly against the surface 118 and rotates relative thereto. It will be understood that the molded rubber sealing element 104 also preferably is of a synthetic rubber or elastomer resistant to water and lubricants.

Finally, the space between the front or shaft seal piece 58 and the rear or guard piece 60 is filled with a waterproof grease 120 as indicated in FIG. 4, but omitted from FIG. 3 for clarity.

It has been found in tests that the guard piece 60 deflects water, and also holds back grit, such as grains of sand. A very small amount of water has been found to pass the guard piece, but no water has been found to pass the grease and the shaft seal piece 58.

Thus, the present water pump seal provides a more reliable seal than heretofore at no increase in cost. The parts cost of the present seal is substantially equal to that of the prior art, and installation cost is much less, since there is no need for lapping surfaces together as in the prior art.

The lip 112 of the guard piece is axially compressed very slightly, on the order of .020 inch. Although it is running against a sheet steel stamping, it does not appear to wear down, due to the light engagement of the parts. It will be appreciated that the actual, final seal against water is effected by the lip 84, and this rides against the shaft 22 which is of hardened steel, and which therefore does not rust readily, even during extended periods of idleness.

It will now be appreciated that an improved water pump seal has been provided. The specific example as set forth herein is for illustrative purposes only. Various changes in structure will no doubt occur to those skilled in the art, and will be understood as forming a part of the present invention insofar as they fall within the spirit and scope of the appended claims.

The invention is claimed as follows:

1. In combination with a water pump having a housing with a central axial cavity and having a rotary shaft with an impeller thereon, a water pump seal comprising a rigid member with a sidewall fixedly fitting in said cavity and with a wall extending radially inwardly therefrom, an elastomeric seal element mounted on said rigid member including a substantially radial wall thereof and having a cantilevered lip circumferentially engaging said shaft, and a guard element fixed on said shaft and rotary therewith and having an elastomeric cantilevered lip thereon riding on said rigid member.

2. The combination as set forth in claim 1 wherein the space between said guard element and said rigid member is filled with a water proof lubricant.

3. In combination with a body having a central axial cavity with a rotary shaft extending therethrough, and having an impeller thereon, shaft seal means comprising first and second seal elements, said first seal element including a rigid portion secured to said body and fixed relative thereto, said first seal element further having a flexible lip extending inwardly from said rigid portion toward said second seal element and riding on said shaft, and said second seal element being fixed to and rotating with said shaft and having a flexible portion engaging the rigid portion of said first seal element.

4. The combination set forth in claim 3 wherein the second seal element has a rigid central portion fixed relative to said shaft, and wherein the flexible portion extends outwardly therefrom.

5. The combination as set forth in claim 3 wherein the first seal element rigid part includes a wall transverse of said axis, and wherein the second seal element flexible portion bears substantially axially against said wall.

6. In combination with a body having a cavity therein and a rotary shaft extending therethrough, shaft seal means comprising a first seal member including a rigid portion having a cylindrical section tightly received in a complementary section of said body, a wall section substantially perpendicular to the axis, said first seal element further having a frusto-conical rigid inner section with a flexible seal thereon having a lip extending therefrom frusto-conically into engagement with said shaft, and a second seal member having a flexible lip bearing substantially axially against said perpendicular surface.

7. The combination as set forth in claim 6 wherein the second seal member has a rigid inner portion fitting on said shaft and having a rigid frusto-conical portion extending outwardly therefrom and toward said perpendicular surface, and a flexible outer portion on said second seal member frusto-conical portion.

8. The combination set forth in claim 7 wherein the flexible portion of the first seal member comprises a cantilevered elastomeric lip bearing on said shaft, and wherein the flexible portion of said second seal member comprises a cantilevered elastomeric lip bearing on the perpendicular face of said first seal member.

9. An assembly for sealing a body cavity through which a rotary shaft extends, said assembly comprising; a first seal member to be fixedly mounted in said body cavity in a position encircling said shaft, said first seal member including a rigid base having a first radially outwardly extending sidewall and a second radially inwardly extending sidewall connected to said first sidewall, said first seal member further including a first seal element secured to said second sidewall, said first seal element having a first resilient annular lip portion for circumferentially engaging said shaft; and a second seal member to be mounted on said shaft for rotational movement relative to said first seal member, said second seal member including a third radially outwardly extending sidewall and a second seal element secured to a radially outer end portion of said third sidewall, said second seal element having a second resilient annular lip portion for engaging said first sidewall, whereby a first fluid-tight joint will be formed between said shaft and said first seal member and a second fluid-tight joint will be formed between said first seal member and said second seal member.

10. An assembly as set forth in claim 9 wherein said first seal member further includes a cylindrical flange extending from a radially outer end portion of said first sidewall to shield said second seal element.

References Cited by the Examiner

UNITED STATES PATENTS

| | | | |
|---|---|---|---|
| 2,145,928 | 2/1939 | Heinze | 277—95 |
| 2,253,904 | 8/1941 | Haug | 103—111 |
| 2,415,888 | 2/1947 | Joy | 277—95 |
| 2,768,849 | 10/1956 | Riesing | 103—111 |
| 3,094,075 | 6/1963 | Logue | 103—111 |
| 3,213,976 | 10/1965 | Yost et al. | 277—95 |

FOREIGN PATENTS 123,654  3/1919  Great Britain.

DONLEY J. STOCKING, *Primary Examiner.*

HENRY F. RADUAZO, MARTIN P. SCHWADRON,
*Examiners.*